No. 811,631. PATENTED FEB. 6, 1906.
A. W. GRAHAM.
PIPE COUPLING.
APPLICATION FILED MAR. 27, 1905.
2 SHEETS—SHEET 1.
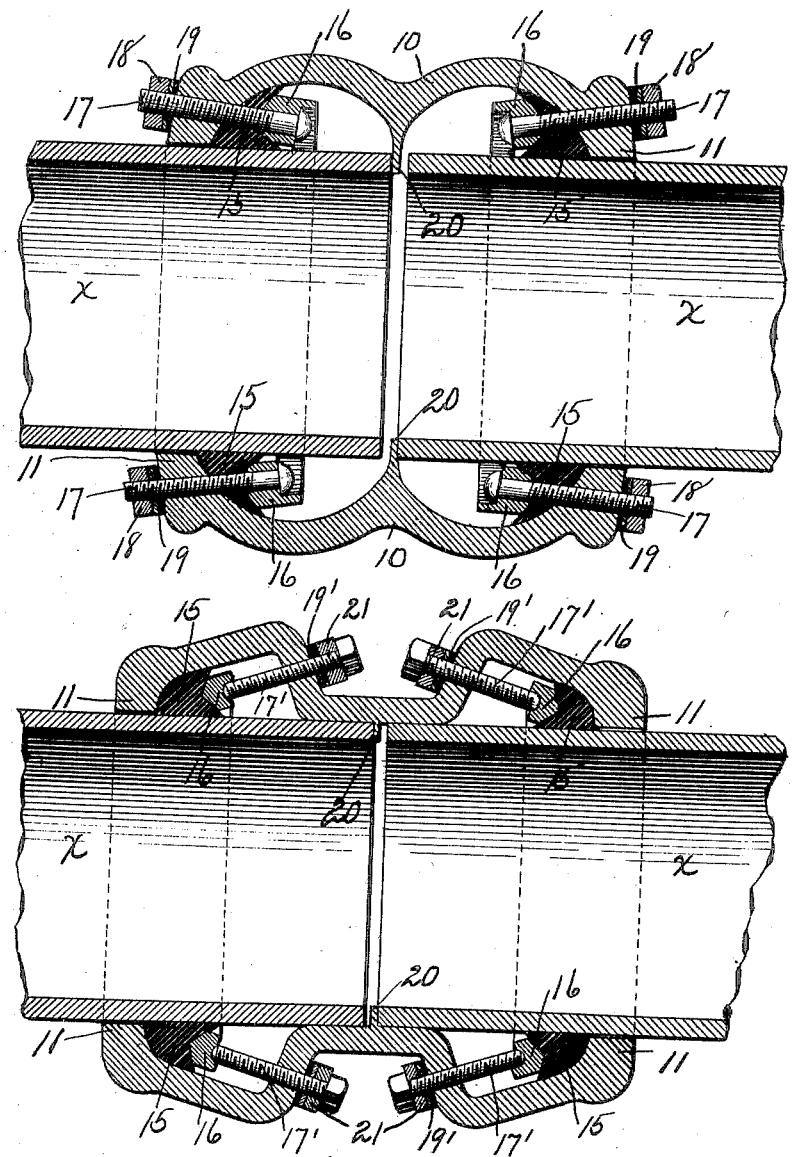

No. 811,631. PATENTED FEB. 6, 1906.
A. W. GRAHAM.
PIPE COUPLING.
APPLICATION FILED MAR. 27, 1905.
2 SHEETS—SHEET 2.
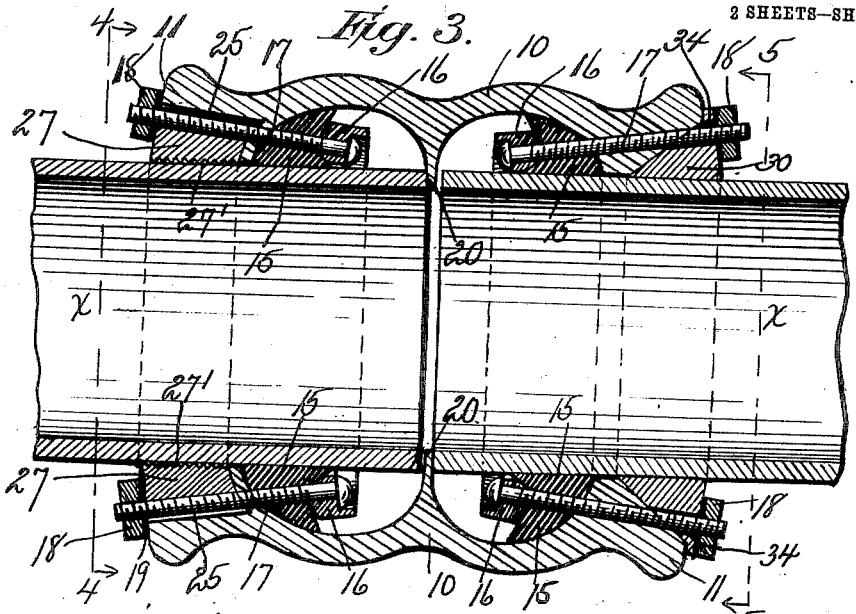
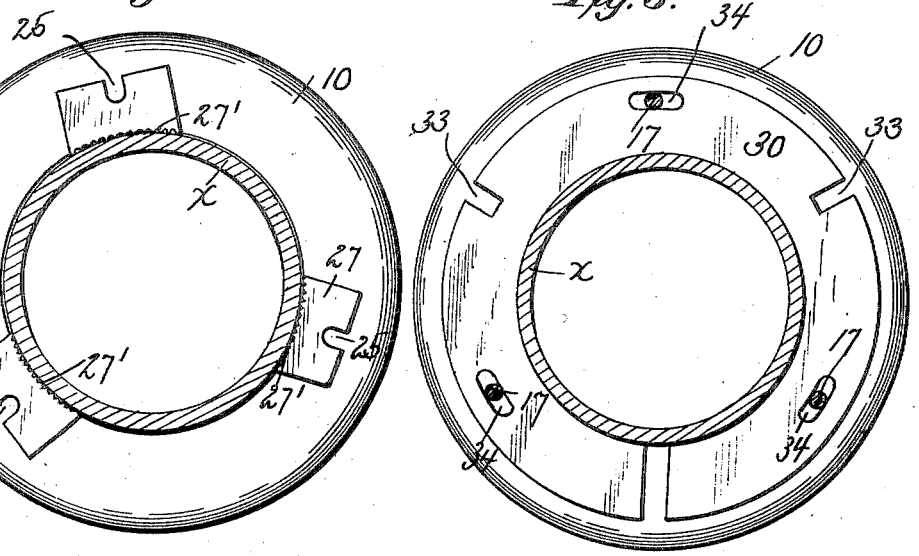
Witnesses
Franck L. Ourand.
W. A. Schunck
Inventor
Andrew Walter Graham
By Albert Popkins
Attorney

UNITED STATES PATENT OFFICE.

ANDREW WALTER GRAHAM, OF BRADFORD, PENNSYLVANIA, ASSIGNOR OF ONE-HALF TO LEWIS E. MALLORY, OF BRADFORD, PENNSYLVANIA.

PIPE-COUPLING.

No. 811,631.

Specification of Letters Patent.

Patented Feb. 6, 1906.

Application filed March 27, 1905. Serial No. 252,308.

*To all whom it may concern:*

Be it known that I, ANDREW WALTER GRAHAM, a citizen of the United States, residing at Bradford, in the county of McKean and State of Pennsylvania, have invented new and useful Improvements in Pipe-Couplings, of which the following is a specification.

This invention relates to pipe-couplings, and has for its principal object to provide a simple form of coupling that may be readily and accurately placed in position, and in which separately-adjustable packing members are employed for the pipe-sections united.

A further object of the invention is to provide a coupling of a self-centering type or of such construction that it cannot be placed in a wrong position even by unskilled workmen, and, further, to so construct the coupling that in the event of breakage of one of the pipe-sections it may be readily removed and replaced by a new one.

A still further object of the invention is to provide a coupling that will permit of the laying of pipe over uneven ground without interfering with the proper packing of the same.

With these and other objects in view the invention consists in the novel construction and arrangement of parts hereinafter described, illustrated in the accompanying drawings, and particularly pointed out in the appended claims, it being understood that various changes in the form and proportions of parts may be made without departing from the spirit or sacrificing any of the advantages of the invention.

In the accompanying drawings, Figure 1 is a longitudinal sectional elevation of a pipe-coupling constructed in accordance with the invention. Fig. 2 is a similar view illustrating a modified construction. Fig. 3 illustrates a still further modification of the invention. Fig. 4 is a transverse sectional elevation of the coupling on the line 4 4 of Fig. 3. Fig. 5 is a similar view on the line 5 5 of Fig. 3.

Similar characters of reference are employed to indicate corresponding parts throughout the several figures of the drawings.

The coupling forming the subject of present invention is designed for universal employment and is of especial value in the running of pipe-lines over uneven ground.

The pipe-sections $x$ are united by coupling members 10, the opposite end portions of which are inturned to form annular flanges 11, which are of a diameter sufficient to permit the ready entrance of the pipe-sections. The couplings are made of cast metal or other material in accordance with the size of the pipe and the character of the work to be performed.

The inner face of each flange is tapered to form a seat for a packing-ring 15, that preferably is formed of rubber or in some cases of spring metal, the particular type of packing material being unimportant. Each packing-ring is independent of the other and is held in place by a follower 16, having a packing-engaging face of wedge shape in cross-section in order to force the packing outward against the inner surface of the coupling member and inward against the surface of the pipe. The followers and the end flanges 11 are both provided with openings for the passage of tension-bolts 17, to the outer threaded ends of which are fitted clamping-nuts 18, washers 19 being preferably introduced between the nuts and the outer faces of the flanges. By this means each packing-ring may be adjusted independently of the other and a fluid-proof joint is insured.

The intermediate portion of the coupling is enlarged, so that in joining two pipe-sections disposed at an angle to each other there will be no strain on either the coupling or the pipe, the inner ends of the latter being freely movable within the coupling, and thus permitting the use of the device when the pipe-sections are laid on uneven surfaces.

In the laying of pipe coupled in the ordinary manner much care is necessary to avoid introducing one section to a greater extent than the other and to prevent longitudinal displacement when the packing is tightened. To overcome this difficulty, centering-tongues 20 are employed, these being extended inward from the central portion of the coupling and arranged to form stops for limiting inward movement of the pipe-sections. Under ordinary circumstances one or two tongues may be employed for each coupling, and those for engagement with one section of pipe are disposed in staggered relation with those for engagement with the opposite section, there being a space between one pipe-section and the tongue, which engages with the opposite section.

When the coupling is formed of cast metal, these tongues preferably form an integral part of the casting, and they are much thinner and weaker than the body of the coupling proper, so that when a broken pipe-section is to be replaced the coupling may be driven in one direction or the other by a maul or other tool, the tongues being readily fractured and permitting such movement. In this manner a damaged pipe-section may be readily replaced at a minimum of labor and expense.

In Fig. 2 is illustrated a slight modification of the invention, in which the bolts 17' act as thrust members passing through threaded openings in the coupling member or sleeve and being provided with suitable jam-nuts 21, and in this case the washers 19' are preferably formed of a yieldable material in order that they may act as packings to prevent leakage around the bolts. In this case the central portion of the coupling-sleeve is extended inward to engage the peripheries of the pipe-sections; but if the pipe is laid on an uneven surface the sections may be drawn slightly outward until one or both ends of the pipe are within the enlarged portions of the coupling-sleeves.

Figs. 3, 4, and 5 illustrate a further modification in which provision is made for more securely holding the pipe-sections to the coupling-sleeve. In this case two forms of pipe-clamps are shown. In one the end flange 11 of the coupling-sleeve is provided with a number of recesses, the outer walls of which are inclined with respect to the longitudinal axis of the coupling. In these recesses are arranged wedge-shaped locking-dogs 27, having toothed or serrated faces 27' for engagement with the pipe, and the outer faces of said dogs are slotted at 25 for the passage of the locking or tension bolts 17, which in this instance serve the double function of compressing the packing material and forcing the dogs to locking position, so that the pipe will be firmly and positively gripped in place.

The second clamping device consists of a split ring 30 of wedge shape in cross-section, said ring being introduced into a correspondingly-shaped annular groove in the flanged end 11 of the coupling-sleeve and held in place by the tension-bolts 17, which also act as packing-compressing devices. The ring is provided with a number of peripherably-disposed slits or notches 33 to permit ready contraction and expansion without breakage, and each of the bolt-passages 34 is slightly elongated in order to prevent binding on the bolts as the ring is forced into place.

With a coupling constructed in accordance with this invention a pipe-line may be readily laid over irregular surfaces, and as each pipe-section is independently packed there will be no danger of leakage.

The tongues 20 are of such character that they may be readily displaced or broken off in case a new section of pipe is to be installed, so that the labor and expense of handling a number of sections in case of breakage is avoided.

Having thus described the invention, what is claimed is—

1. The combination in a pipe-coupling, of a sleeve having a centrally-enlarged portion and provided with end flanges the inner faces of which form tapering packing-seats, an independent packing-ring for each seat, a follower for each ring, and bolts for compressing the packing between the packing-seat and follower.

2. In a pipe-coupling, a sleeve having end flanges provided with tapered recesses in its outer ends, packing-rings bearing against the inner faces of the flanges, pipe gripping or clamping members arranged in said tapered recesses, and a clamping means engaging both the packing-rings and clamping members.

3. In a pipe-coupling, a sleeve having tapered end recesses, pipe-clamping members therein, a packing-ring, a follower therefor, and clamping-bolts extending through the flange and serving to draw the clamping members and follower toward each other.

4. In a pipe-coupling, a sleeve having an end flange provided with a tapered recess, a split ring seated therein and having peripheral notches, a packing-ring seated against the inner wall of the flange, a follower for said packing-ring and bolts connecting the follower and split ring.

5. A coupling having a plurality of staggered centering-tongues for independently engaging the ends of different pipe-sections.

In testimony whereof I affix my signature in presence of two subscribing witnesses.

ANDREW WALTER GRAHAM.

Witnesses:
 ALBERT POPKINS,
 J. FRED. KELLEY.